Figure 1:
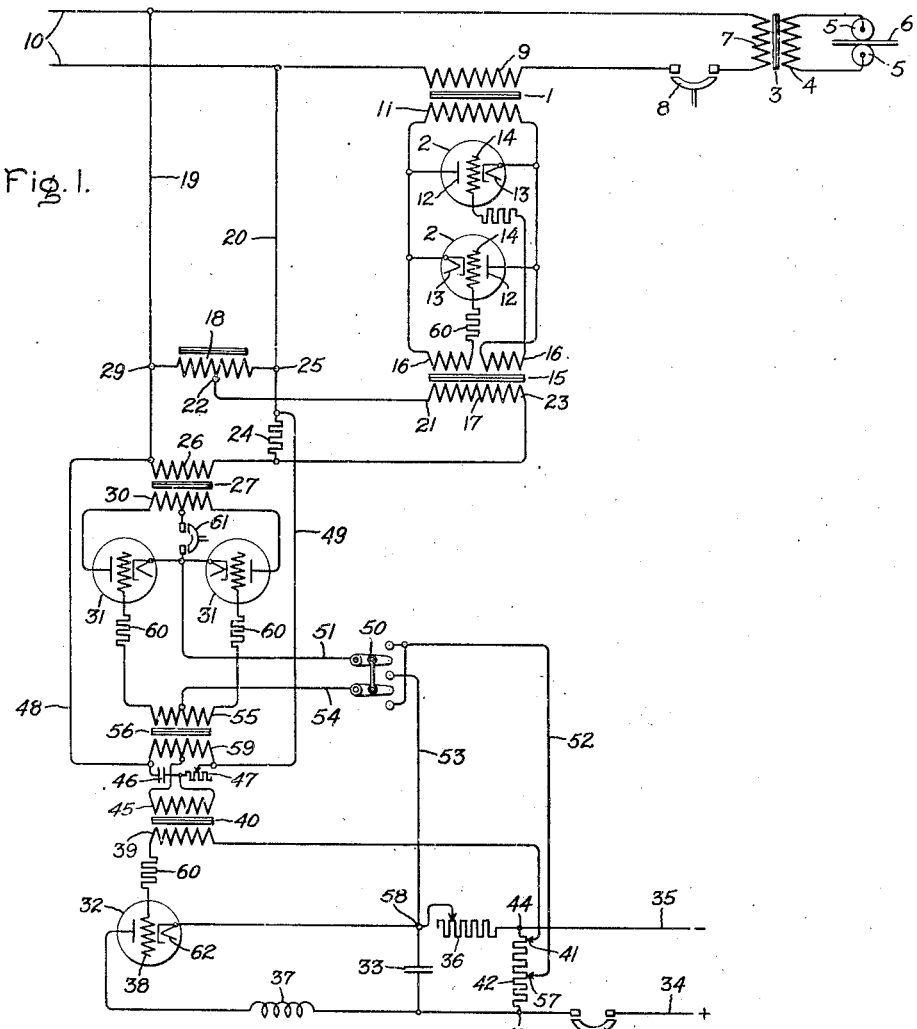

Inventor:
Harold W. Lord,
by Charl V Mell
His Attorney.

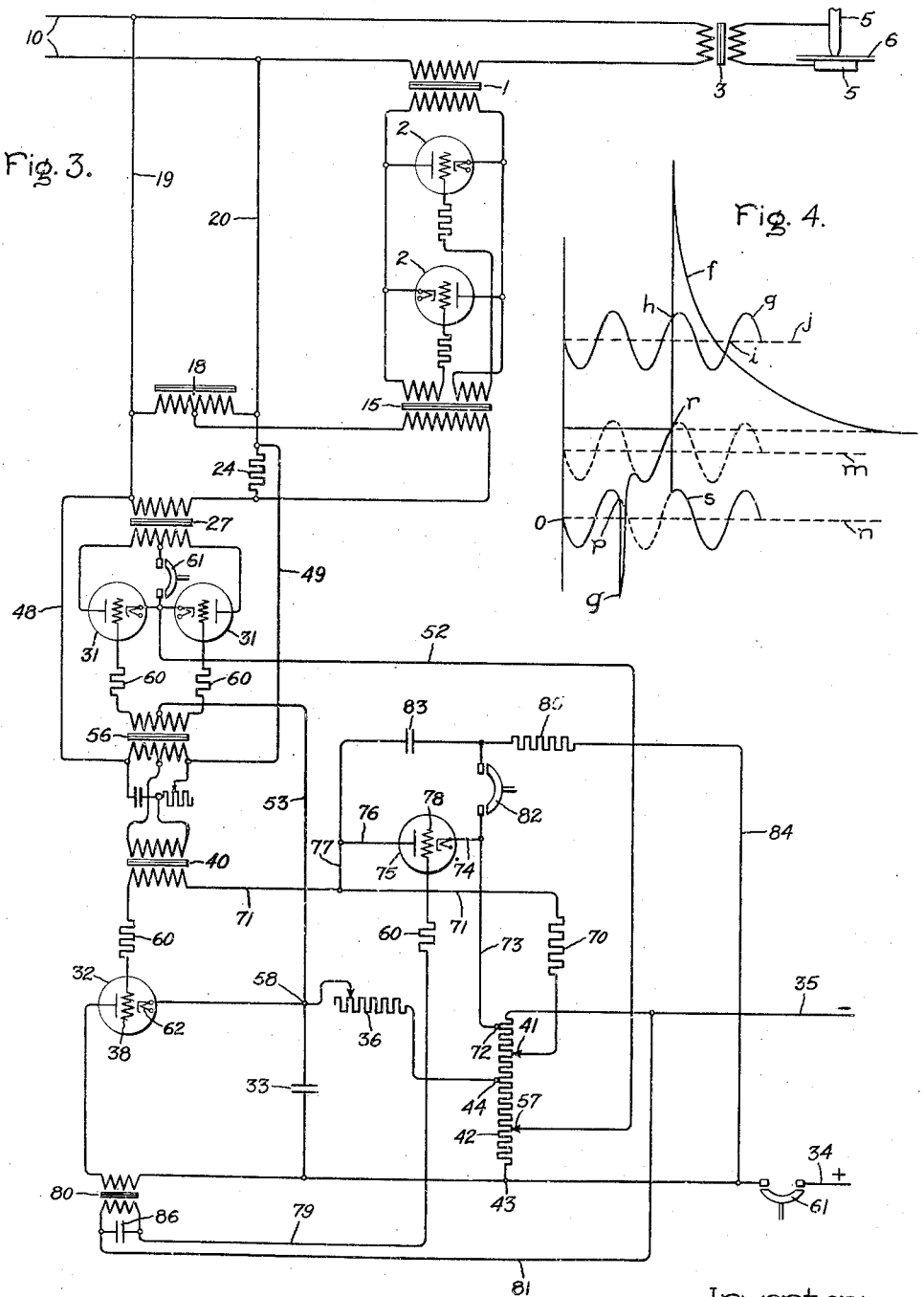

Patented Aug. 19, 1941

2,253,129

UNITED STATES PATENT OFFICE 2,253,129

CIRCUIT INTERRUPTER

Harold W. Lord, Schenectady, N. Y., assignor to General Electric Company, a corporation of New York Application January 7, 1932, Serial No. 585,292

33 Claims. (Cl. 219—4)

My invention relates to improved circuit controllers by means of which a single application of current or a plurality of applications of current is applied from a source of periodic current to a load device. By means of my invention the flow of current is initiated and interrupted at predetermined points in the voltage cycle of the source of supply, and the adjustments may be such as to obtain a synchronous control of the current flow from said source of supply.

My invention although applicable to power circuits generally will be described in connection with resistance welding systems to which it is particularly applicable.

In many resistance line welding installations the current to the primary of the welding transformer is periodically interrupted. Thus as the metal to be welded is fed between the electrode rolls, the resulting line weld is in reality a series of overlapping spot welds. Control of the current is usually accomplished by a cam driven contactor. As this contactor must carry and interrupt rather heavy currents, it is of necessity quite large and the inertia of its moving parts puts a limitation on the speed at which it may be operated. Furthermore, due to arcing when interrupting heavy currents the contacts of the contactor rapidly wear away and change the ratio of the time the contactor is carrying current to the time during which the current is interrupted, thus causing a reduction in the heat put into the weld. This is particularly objectionable in making long welds for if the heat be set to give a good weld without burning at the start of the weld, then the end of the weld will be weak due to the reduction of heat caused by the change in the ratio of the current-on to the current-off periods.

Furthermore, it is desirable to initiate and interrupt the flow of welding current at the same points in the voltage cycle of the source of supply. If this is not done, there may be as much as one cycle difference in the length of time that current is flowing. At low speeds of interruption this one cycle difference is such a small part of the total number of conducting cycles that the difference in the heat supplied to the welds is not noticeable. At higher speeds, however, where current is supplied only for a few cycles at a time, a one cycle variation is objectionable and causes uneven welds. Also if the flow of current is not initiated each time at the same point in the voltage cycle, different transient current conditions occur in the welding circuit resulting in different values of current flow and consequently non-uniform welds. For the minimum transient condition, the welding circuit should be closed at a point in the voltage cycle corresponding to the phase angle of current flow.

It is an object of my invention to provide a controller which may be used with resistance line welding machines for periodically increasing and decreasing the flow of current supplied to the welding electrodes at predetermined points in the voltage cycle of the source of supply to establish uniform periods of current flow and uniform heating even at high speeds of operation.

It is another object of my invention to provide a controller whose speed of operation is not affected or limited by the inertia of moving mechanical parts.

It is a further object of my invention to provide a controller by means of which synchronous timing of the welding current is obtained.

It is a further object of my invention to provide a controller by means of which the current applied to the electrode has a period which is a multiple of the period of the source of supply.

My invention is also applicable to resistance spot welding machines in which it is desired to apply the welding current to the work for a predetermined length of time. The controller of my invention may be used with spot welding machines for controlling the flow of current for periods as short as a part of one cycle of the source of supply. My invention as so applied constitutes means for generating surges or pulses of current which are initiated and interrupted at predetermined points in the voltage cycle of the source of supply with which it is associated and which it controls.

It is consequently a further object of my invention to provide a controller for resistance spot welding apparatus by means of which a single application of welding current may be supplied to the welding electrodes from a source of supply the flow of which is initiated at a predetermined point in the voltage cycle of the source of supply and interrupted a predetermined time thereafter.

This and other objects of my invention will become apparent from a consideration of the following description of the two embodiments of my invention shown in the accompanying drawings.

Figure 2:
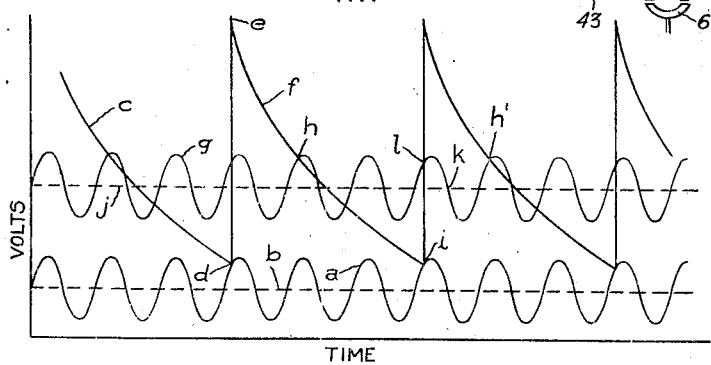

Fig. 1 of these drawings shows my invention as applied to resistance line welding machines; Fig. 2 shows a graphic representation of the control voltages in the system of Fig. 1; Fig. 3 shows my invention as applied to resistance spot welding machines, and Fig. 4 shows a graphic representation of the control voltages in the system of Fig. 3.

The flow of current in the welding circuit shown in Fig. 1 is controlled by varying its impedance through the agency of electric valves which are controlled by periodic voltages generated in an inverter circuit associated with them and the source of welding current supply.

In the arrangement illustrated the impedance of the welding circuit is controlled by means of a reactance placed in series with the primary of the welding transformer. As illustrated, this reactance takes the form of a series transformer 1 whose primary impedance is controlled by electric valves or space-discharge devices 2. The welding circuit includes a welding transformer 3 whose secondary 4 is connected to the welding electrodes 5 between which the work 6 is inserted, and whose primary 7 is connected through a switch 8 and the primary 9 of the series transformer 1 to a source 10 of a periodic current such as alternating current. In line welding it is the practice to close the welding circuit after pressure has been applied to the welding electrodes and to open this current before pressure is removed from the electrodes in order to prevent arcing between the electrodes and the work. In the drawing switch 8 represents such a switch.

The secondary 11 of the series transformer 1 is connected to inversely or asymmetrically disposed electric valves 2 which are provided with anodes 12, cathodes 13 and control elements or grids 14. These valves may be of any suitable type, although I prefer to use vapor electric or arc discharge valves of the character disclosed in Langmuir Patent No. 1,289,823, granted December 31, 1918. Such valves consist of a cathode, a control element, usually referred to as a grid, an anode and a small amount of inert gas or vapor. Current passes through the valve as an arc, whose starting may be controlled by the grid. After starting, the discharge cannot be further influenced by the grid but it can be stopped by removing the anode voltage. The operation of such a valve consists in periodically removing or reversing the anode voltage to stop the discharge and controlling its restarting by the grid. The valve, therefore, operates with an intermittent arc discharge whose average current is controlled by the grid.

The valves 2 are arranged to short circuit the secondary 11 of the series transformer 1 when made conductive. Short circuiting the secondary of the transformer 1 reduces the impedance of the primary to a very small value and allows approximately full load current to flow to the primary of the welding transformer 3.

The conductivity of valves 2 is controlled through the agency of a grid transformer 15 whose secondaries 16 are connected to the grids and cathodes of the valves 2, and whose primary 17 is connected across the impedance 18 which is connected through conductors 19 and 20 to the source of supply 10. One terminal 21 of the primary of the grid transformer is connected to a midtap 22 of the impedance 18. The other terminal 23 is connected either through a resistance 24 to terminal 25 of impedance 18 or through the primary 26 of a transformer 27 to the terminal 29 of impedance 18. By short circuiting the secondary 30 of transformer 27 the impedance of its primary 26 is made very small and this acts to transfer the connection of primary 17 of the grid transformer 15 from terminals 22, 25 to terminals 22, 29 of the impedance 18. This produces an approximately 180° phase shift in the grid voltage of the valves 2. Thus, when the secondary 30 of the transformer 27 is not short circuited the voltage of the grids 14 of the valves 2 are approximately 180° out of phase with the voltages of their anodes, and the tubes are rendered non-conducting. When the secondary 30 of transformer 27 is short circuited, the phase of the grid voltage is shifted reversing the grid phase and rendering the valves conductive.

The short circuiting of the secondary 30 of the transformer 27 is under the control of asymmetrically disposed electric valves 31. The conductivity of these valves is controlled by a bias voltage and a voltage of greater amplitude and period than said bias voltage which is opposite in effect thereto and which is obtained from an inverter circuit containing an electric valve 32.

The inverter circuit employed is a modified form of the circuit shown in Patent No. 1,859,082, granted May 17, 1932, on an application, Serial No. 193,428, Alan S. FitzGerald and Henry L. Palmer for Circuit interrupter, filed May 23, 1927, and assigned to the same assignee as the present application. It comprises a capacitor 33 or other suitable energy storing device which is periodically charged and discharged through the agency of an electric valve connected in one of its circuits. In the particular arrangement illustrated the capacitor 33 is charged from a direct current source 34, 35 through an impedance 36, illustrated as a resistance, and discharged through a circuit including electric valve 32 and a reactance 37. Either or both the capacitor 33 and resistance 36 may be made adjustable in order to adjust the period of the voltage generated by the circuit. The grid 38 of valve 32 is connected through the secondary 39 of a transformer 40 to a slider 41 of potentiometer 42. In the particular arrangement illustrated this potentiometer is connected at 43 and 44 to the source of supply 34, 35 in parallel with the charging circuit of capacitor 33. The primary 45 of transformer 40 is connected through a phase shifting circuit comprising a capacitor 46 and a resistance 47 to the source of supply 10 through conductors 48, 19 and 49, 20.

The grids of valves 31 are connected through a switch 50 to the inverter circuit thus described through conductors 51, 52, 53 and 54, and the secondary 55 of a transformer 56. In the particular arrangement illustrated the connection is made at slider 57 of potentiometer 42 and at 58 between the resistance 36 and capacitor 33, although other connections may be resorted to by means of which a periodic voltage of greater amplitude than the bias voltage of valves 31 may be obtained from the inverter circuit. The primary 59 of transformer 56 is connected through conductors 48, 19 and 49, 20 to the source of supply 10.

The grid circuits of each of the electric valves 2, 31 and 32 are provided with protecting resistance 60 and the cathodes of these tubes are protected by switches 61 which are of the time delay type and are normally closed after the several tubes have been properly heated.

The system will be better understood after a consideration of its operation which is as follows: Assuming that switches 61 are closed and that switch 50 is in its down position, the instant the source of supply 34, 35 is connected to the inverter circuit the voltage across capacitor 33 is zero since it is still uncharged and the full voltage of the source will thus appear across the resistance 36. The potential of terminal 58 of the capacitor will thus be the same as that of terminal 34 of the source of supply and, due to the position of the slider 41 on potentiometer 42 grid 38 of valve 32 will be negative with respect to its cathode 62 which is connected to the terminal 58, the alternating current voltage impressed on the grid through transformer 40 in addition to the voltage obtained from the potentiometer 42 through slider 41 being less than the voltage across resistor 36. As the capacitor 33 charges up the point 58 becomes more and more negative until eventually the grid 38 is positive relative to the cathode 62 and the valve 32 will conduct current thereby discharging capacitor 33. Through the presence of reactance 37 or the inherent reactance of the discharge circuit the voltage of the valve 32 is momentarily reversed and current flow through the valve is interrupted until the above operation is again repeated.

The periodic voltage appearing across resistance 36 in the charging circuit of the capacitor 33 is impressed on the grids of valves 31 in opposition to a bias voltage comprising the voltage of transformer 56 and a voltage determined by the position of slider 57 on potentiometer 42. The periodic voltage obtained from the inverter circuit across resistance 36 is greater in amplitude than the combined voltage of transformer 56 and the voltage obtained from potentiometer 42. With the switch 50 in the down position and the capacitor 33 uncharged the cathodes of valves 31 are positive with respect to their grids and valves 31 are non-conductive. As the capacitor 33 charges up, however, a point is reached where the bias voltage comprising the voltage obtained from potentiometer 42 and the voltage of transformer 56 becomes greater than the voltage across the resistance 36, in other words the voltage of terminal 58, and valves 31 are rendered conductive.

When valves 31 are rendered conductive, valves 2 are also rendered conductive and the current in the welding circuit is increased due to the decrease of the impedance of the welding circuit through conduction of current through valves 2. After valve 32 has discharged condenser 33, valves 31 are again biased off and the interruption of current flow through their circuit interrupts the flow of current through the circuit of valves 2, thereby increasing the impedance of the welding circuit and decreasing the flow of welding current.

The values of the control voltages above referred to have been graphically represented in Fig. 2. In this figure the bias voltage of grid 38 of valve 32 is shown at a which comprises the alternating current voltage of transformer 40 and the voltage b obtained from potentiometer 42 through slider 41. The voltage across resistance 36 is shown by curve c from the time that source 34, 35 is connected to the inverter circuit until the valve 32 is rendered conductive at point d. The voltage of source 34, 35 is assumed to be 250 volts and the initial voltage of terminal 58 is consequently 250 volts occurring at the time of connecting the source of supply to the inverter circuit. When the potential of terminal 58 or the cathode 62 becomes less than that of the grid 38 which has a bias voltage a valve 32 fires at d, and the voltage of terminal 58 increases to some value e which is in excess of 250 volts due to the presence of reactance in the discharge circuit of the valve 32. The voltage of terminal 58 or cathode 62 thereafter decreases along a curve f which intersects curve g at h and curve a at i. Curve g represents the bias voltage of the grids of valves 31 and comprises the alternating current voltage of transformer 56 and a bias voltage j corresponding to the position of slider 57 on potentiometer 42. Where the voltage across the resistance 36 decreases below the bias voltage applied to the valves 31 these tubes are rendered conductive and current continues to flow in an arc discharge device until k, although with high vacuum tubes the flow of current is practically interrupted at l. Current flow through tubes 31 is again initiated at h' and the cycle just considered is again repeated.

It will be noted that the control voltage obtained from the inverter circuit has a period equal to a multiple of the period of the source of supply. In the particular instance the period is three times as long. It will also be noted that current is initiated and interrupted at predetermined points in the voltage cycle of the source of supply 10. By shifting the phase relationship of the grid potential of valves 31 and 32 through the agency of transformers 40 and 56, it is possible to adjust the time at which current flow is increased and decreased since by this adjustment curves a and g are shifted relative to one another. It is not necessary to employ a transformer 56 although it is preferable to do this since the periodic voltage applied to the grids of tubes 31 causes the apparatus to function more positively because the wave peaks of the bias voltage render insignificant slight voltage variations in the control circuit resulting from using valves of slightly different characteristics. The varying characteristics of the valves may result from variations in manufacture as well as from their age.

The connection of the inverter circuit with the source of supply 10 through transformer 40 causes it to operate in synchronism therewith at a submultiple frequency when the inverter circuit has been adjusted to have a voltage period which is equal to a multiple of the voltage period of the source. The voltage period of the inverter circuit is determined by the relative adjustment of the impedance 36 and capacitor 33. The amplitude of this voltage is determined by the voltage of the source of supply and the value of the impedance 37 in the discharge circuit. In the particular arrangement illustrated, with the switch 50 down the system is adjusted for welding control with short periods "off" and long periods "on." By throwing switch 50 to its upper position the situation is reversed and will best function for short periods "on" and long periods "off."

For installations requiring small currents valves 2 may be eliminated. The control as thus simplified will be the same as illustrated except that valves 31 will be used where valves 2 are used in the figure illustrated, the secondary 11 of the series transformer 1 being connected directly to the valves 31. It is likewise apparent that the discharge circuit of the inverter may also be used where single surges of current are desired although a modified form of my invention such as illustrated in Fig. 3 is better suited for this purpose.

The arrangement shown in Fig. 3 of the drawing illustrates my invention as applied to resistance spot welding apparatus. As so applied it is used to control the period of application of the welding current for times as short as a part of a cycle of the source of supply.

In resistance spot welding machines a small switch, which may be operated by a cam on the shaft which closes the welding points, is usually employed for controlling the welding circuit. The arrangement is such that the switch closes and welding current is applied after pressure has been applied to the welding points, and that the switch is opened and current interrupted before this pressure is released. The switch is usually cam operated and the speed at which the cam revolves as well as the welding transformer ratio is customarily used to adjust the heat supplied to the weld. In my proposed arrangement a switch such as the cam operated switch referred to is used solely for starting a control circuit including electric valves by means of which welding current is applied to the electrodes, the duration of the flow of welding current being under the control of the circuit at all times and only starting again when the switch has been opened and reclosed.

The control circuit of Fig. 3 illustrating one embodiment of my invention as applied to spot welding machines is essentially the same as that shown in Fig. 1, except that the inverter circuit has been slightly modified to permit the generation of single surges of voltage and current. Because of the correspondence of the two systems in Figs. 1 and 3, like reference numbers have been applied to corresponding parts in the two figures.

In Fig. 3 the connection 44 of the charging circuit of the inverter has been made at a midpoint of the potentiometer 42 which is connected to the source of supply 34, 35. A source of negative potential for grid 38 of valve 32 is thus provided through slider 41, resistance 70, and conductor 71. A more negative source of grid potential may be obtained from connection 72 through conductors 73, 74, valve 75 and conductors 76, 77 when valve 75 is rendered conductive. This valve is of the arc discharge type above referred to. Its grid 78 is connected through a protective resistor 60, conductor 79, the secondary of grid transformer 80 and conductor 81 to the negative terminal 35 of the source of supply connected to the potentiometer 42. It will be noted that due to this connection when no voltage is induced in the transformer 80 the grid of valve 75 is negative with respect to its cathode and the valve is biased off. The grid transformer 80 is in the discharge circuit of capacitor 33 and due to the surge of voltage induced in the grid transformer upon the flow of current in this discharge circuit the valve 75 will be rendered conductive.

This valve, due to its characteristics, can only be turned off or rendered non-conductive by removing or reversing its anode voltage. This is accomplished through the agency of switch 82 and a capacitor 83. Switch 82 is the switch above referred to usually associated with the electrodes of spot welding machines. Upon the closure of switch 82 the capacitor 83 is connected across the terminals of valve 75. This capacitor 83 has been charged from the source of supply 34, 35 through conductor 84, resistance 85, conductors 77 and 71, resistance 70 and connection 41 by potentiometer 42. By closing the switch 82, the positively charged terminal of capacitor 83 is connected to the cathode of valve 75 and the negatively charged terminal of the capacitor pulls the anode of valve 75 negative with respect to the cathode until the capacitor discharges through resistance 70. This discharge time is made sufficiently long for valve 75 to deionize and establish grid control. With valve 75 held off, its anode is pulled positive until capacitor 83 has been charged through resistance 70 in the reverse direction to a voltage determined by the setting of slider 41. Valve 75 is thus in condition to be rendered conductive at or near the peak of the next positive half cycle as pointed out below.

As has been pointed out above, when valve 75 is non-conductive, the bias on the grid of valve 32 is determined by the position of slider 41. When valve 75 is conducting, the bias is greater by the amount of voltage drop in resistance 70 due to the current through valve 75; in other words, the bias is greater by the voltage between terminal 72 and slider 41 of the potentiometer 42 disregarding voltage drops in the circuit between this terminal and the grid of valve 32. The position of slider 41 is so adjusted that when valve 75 is not carrying current the alternating voltage applied to the grid 38 of valve 32 through transformer 40 is just sufficient to cause that valve to conduct near the peak of the voltage wave. However, when valve 75 is conducting, the bias on grid 38 of valve 32 is always sufficiently negative to hold this valve off. Thus, the normal off position of the circuit is with valve 75 conducting and slider 57 in such a position that the grids of valves 31 are sufficiently negative to hold them off.

Switch 82 is closed after pressure has been applied to the welding points of electrodes 5, 5. The closing of this switch extinguishes valve 75 by means of capacitor 83 as above described. This permits the bias voltage of valve 32 to be reduced to the setting of slider 41 which is low enough for the alternating current voltage induced in the circuit of grid transformer 40 to render this tube conductive at a predetermined point in the voltage cycle of the source of supply 10. The conduction of valve 32 discharges capacitor 33 and this causes valves 31 to conduct, reversing the polarity of the grid voltages of valves 2 allowing them to conduct and pass current to the welding transformer as has been described above in connection with Fig. 1. The capacitor 33 is charged again through resistance 36 and after a time determined by its charging rate valves 31 are again cut off thereby rendering valves 2 non-conducting and decreasing the flow of current to the welding circuit as described above. Grid transformer 80 is in the discharge circuit of capacitor 33 and puts a transient voltage on the grid 78 of the valve 75, which renders this valve conductive and again puts the higher negative grid bias on valve 32 so as to prevent its conducting again even though switch 82 remains closed. After switch 82 is opened the charge on capacitor 83 is changed to its original polarity and the circuit is again in a position to operate. Valves 32 and 75 consequently function as start and cut-off devices in this circuit.

An understanding of the operation just described may be facilitated by reference to Fig. 4 which graphically represents the control voltages referred to. In the diagram of Fig. 4 the zero voltage or reference voltage is the voltage at point 44. The voltage of slider 41 is represented at $m$ and the voltage of connection 72 at $n$. Superimposed on these voltages is the voltage of the grid transformer 40. Starting at $o$ the grid voltage of valve 32 follows the heavy line to $p$ where due to the closing of switch 82 and the connection of capacitor 33 in the circuit, the voltage is momentarily reduced to some value q. Due to the extinction of valve 75, the bias voltage becomes less negative and eventually at r valve 32 conducts. Thereafter valve 75 upon being rendered conductive due to the voltage applied to its grid through grid transformer 80 connected in circuit with valve 32 transfers the connection from slider 41 to terminal 72 and applies to the grid of the valve 32 a voltage s, such as was originally applied thereto, which is sufficiently negative to render this valve non-conductive. After the discharge of capacitor 33 through valve 32, capacitor 33 is charged again producing a transient voltage across resistance 36 which is applied to the control elements of valves 31 which have an opposing bias voltage g made up of a direct current voltage j and an alternating current voltage induced into the circuit through grid transformer 56. Valves 31 are rendered conductive at h and non-conductive at i.

If the circuit through valve 75 be interrupted at 76, for example, the inverter circuit of Fig. 3 will function in the same manner as the inverter circuit of Fig. 1, and the system disclosed in Fig. 3 may be used for line welding operations as is the circuit of Fig. 1. The connection of conductors 52 and 53 to the grids and cathodes of valves 31 may be controlled by a switch such as switch 50 shown in Fig. 1. Furthermore, the phase relationship of the voltages induced in the grid circuits of valves 31 and 32 by means of transformers 40 and 56 may be adjusted by a suitable phase shifting circuit in order to adjust the operation of the system. Such an adjustment was described in connection with the system of Fig. 1. A capacitor 86 connected across the secondary of grid transformer 80 is employed to flatten out the peak voltage generated therein upon the discharge of capacitor 33 and is employed to facilitate the operation of valve 75.

In describing the operation of the above system it has been assumed that the valves were of the arc discharge type with zero grid characteristics. Such devices will become conductive when their grid potential is zero with respect to their cathode potential. It is to be understood, however, that arc discharge devices with positive or negative grid characteristics may be used without departing from my invention, and as indicated above that electric valves other than valves of the arc discharge type may be used. Because of their current carrying capacity and peculiar characteristics, however, it is preferable to use valves of the arc discharge type for commutating the secondary of the series transformer 1 and for controlling the inverter circuit.

Although I have described my invention in connection with welding circuits, it is to be understood that my invention is not limited to such circuits, but may be employed in any power circuits in which it is desired accurately to determine the periods of current flow relative to the periods of current interruption.

Although I have described but two modifications of my invention, other modifications will occur to those skilled in the art in view of the above description, and it is to be understood that various modifications may be made without departing from the spirit of my invention.

What I claim as new and desire to secure by Letters Patent of the United States is:

1. A power circuit, means including an electric valve provided with a control element, for controlling the conductivity of said circuit, an energy storage device, circuit means for charging and discharging said energy storage device, controlling means for obtaining a single surge of voltage in said circuit means, means for initiating the operation of said controlling means, and means for applying to said control element of said electric valve a surge voltage of said circuit means.

2. A power circuit, means including an electric valve provided with a control element, for controlling the conductivity of said circuit, a capacitor, means for initiating a discharge circuit for said capacitor, means responsive to current flow in said discharge circuit for automatically opening said discharge circuit after said capacitor has been discharged to a predetermined voltage, means including an adjustable charging circuit for recharging said capacitor at an adjustable rate to a predetermined voltage, and means for applying to said control element of said electric valve a surge voltage derived from said charging circuit.

3. A power circuit comprising a source of current, a load device, means including an electric valve provided with a control element, for controlling the flow of current from said source to said load device, means for applying to said control element a control voltage sufficient to render said electric valve conducting, means including a second electric valve for applying to the control element of said first electric valve when said second electric valve is conducting a voltage greater than said control voltage to render said first electric valve non-conducting, and means for rendering said second electric valve conducting upon the flow of current through said first electric valve.

4. A power circuit comprising a source of periodic current, a load device, means including an electric valve provided with a control element, for controlling the flow of current from said source to said load device, means for applying to said control element a bias voltage and a control voltage sufficient to overcome said bias voltage and render said electric valve conducting, means including a second electric valve for applying to the control element of said first electric valve when said second electric valve is conducting a second bias voltage greater than said control voltage to render said first electric valve non-conducting, and means for rendering said second electric valve conducting upon the flow of current through said first electric valve.

5. A power circuit, an electric valve for controlling the conductivity of said power circuit, a source of current, a capacitor, a circuit for charging said capacitor from said source, a circuit for discharging said capacitor, an electric valve connected in said discharge circuit and provided with a control element, means for impressing on the control element of said last mentioned valve a bias voltage of the frequency of said power circuit and a periodic voltage of greater amplitude than said bias voltage which is opposite in effect to said bias voltage, and means for impressing on the control element of said first mentioned valve a periodic voltage of one of said capacitor circuits.

6. A power circuit comprising a source of periodic current, a load device, means including an electric valve provided with a control element for controlling the flow of current from said source to said load device, a second source of current, a capacitor, a circuit for charging said capacitor from said second source, a circuit for discharging said capacitor including a second electric valve provided with a control element, means for applying to the control elements of each of said valves a bias voltage whose period is equal to that of said source of periodic current and a periodic voltage of one of said capacitor circuits greater in amplitude than said bias voltage and opposite in effect thereto.

7. A power circuit comprising a source of periodic current, a load device, means including an electric valve provided with a control element for controlling the flow of current from said source to said load device, a second source of current, a capacitor, a circuit for charging said capacitor from said second source, a circuit for discharging said capacitor including a second electric valve provided with a control element, means for applying to the control elements of each of said valves a bias voltage whose period is equal to that of said source of periodic current, and a periodic voltage of one of said capacitor circuits greater in amplitude than said bias voltage and opposite in effect thereto, and means for adjusting the phase relationship of said periodic bias voltages.

8. A power circuit comprising a source of periodic current, a load device, means including an electric valve provided with a control element for controlling the flow of current from said source to said load device, a second source of current, a capacitor, a circuit for charging said capacitor from said second source, a circuit for discharging said capacitor including a second electric valve provided with a control element, means for applying to the control elements of each of said valves a bias voltage whose period is equal to that of said source of periodic current, and a periodic voltage of one of said capacitor circuits greater in amplitude than said bias voltage and opposite in effect thereto, and means for adjusting the constants of said capacitor circuits.

9. A circuit for generating surges of voltage and current comprising a source of current, a capacitor, a circuit for charging said capacitor, an impedance in said charging circuit, means for adjusting the relative values of said impedance and said capacitor, a circuit for discharging said capacitor including an electric valve provided with a control element, means for applying to said control element a bias voltage and a periodic voltage whose maximum value is just sufficient to overcome said bias voltage to render said valve conducting, means including a second electric valve for applying to the control element of said first electric valve a second bias voltage to render said first electric valve non-conducting when said second electric valve is conducting, and means for rendering said second electric valve conducting upon a flow of current in said discharge circuit.

10. A circuit for generating surges of voltage and current comprising a source of current, a capacitor, a circuit for charging said capacitor, an impedance in said charging circuit, means for adjusting the relative values of said impedance and said capacitor, a circuit for discharging said capacitor including an electric valve provided with a control element, means for applying to said control element a negative bias voltage and an alternating current voltage whose maximum value is just sufficient to overcome said negative bias voltage to render said valve conducting, means including an arc discharge device having an anode, a cathode and a control element for applying to the control element of said electric valve a second negative bias voltage to render said electric valve non-conducting when said arc discharge device is conducting, a second capacitor, means for normally charging said second capacitor to a predetermined polarity, means for discharging said second capacitor and charging it with reversed polarity, the discharge time of said means being greater than the deionization time of said arc discharge device, switching means for connecting said second capacitor to said second charging means and to said arc discharge device with its normally positively charged terminal connected to the cathode of said arc discharge device and its normally negatively charged terminal connected to the anode thereof, and means responsive to the flow of current in said discharge circuit of said first capacitor for applying a voltage to the control element of said arc discharge device sufficiently positive to render it conducting.

11. An electric circuit comprising a source of alternating current, a load device, means including an electric valve, for controlling the flow of current from said source to said load device, said valve having a control element and an anode-cathode circuit energized from said source, an energy storage device, circuit means including a second electric valve having a control element, for charging and discharging said energy storage device, means for applying to the control element of said first electric valve a control voltage derived from said circuit means, means for applying an alternating voltage of the same frequency as said source and a bias voltage greater than the maximum value of said alternating voltage to the control element of said second electric valve, means for reducing the magnitude of said bias voltage on the control element of said second electric valve to a value less than the maximum value of said alternating voltage and thereafter upon the flow of current through said second electric valve increasing said bias voltage on the control element of said second electric valve to a value greater than the value of said alternating voltage, and means for adjusting the phase relationship between the alternating voltage applied to the control element of said second electric valve and the alternating voltage of said source.

12. Resistance welding apparatus comprising welding electrodes, a source of periodic current, an electric valve provided with a control element, means including said electric valve for controlling the flow of current to said electrodes from said source of periodic current, a source of control voltage of sufficient magnitude to render said electric valve conducting when applied to said control element thereof, and means for applying said control voltage to said control element of said electric valve for starting the flow of current to said electrodes at a predetermined point in the voltage wave of said source of periodic current.

13. Resistance welding apparatus comprising welding electrodes, a source of periodic current, an electric valve provided with a control element, means including said electric valve for controlling the flow of current to said electrodes from said source of periodic current, a source of control voltage of sufficient magnitude to render said electric valve conducting when applied to said control element thereof, means for applying said control voltage to said control element of said electric valve for starting the flow of current to said electrodes at a predetermined point in the voltage wave of said source of periodic current, and means for controlling the period of time during which said control voltage is effective for rendering said electric valve conducting.

14. Resistance welding apparatus comprising welding electrodes, a source of periodic current, an electric valve provided with a control element, means including said electric valve for controlling the flow of current to said electrodes from said source of periodic current, a source of control voltage of sufficient magnitude to render said electric valve conducting when applied to said control element thereof, and means for adjusting the time of application of said control voltage to the control element of said electric valve for adjusting the time at which current starts to flow to said electrodes to correspond with a predetermined point in the voltage wave of said source of periodic current.

15. Resistance welding apparatus comprising welding electrodes, a source of periodic current, an electric valve provided with a control element and having its anode-cathode circuit energized from said source, circuit means including said electric valve for controlling the flow of current to said electrodes from said source, a capacitor, means for charging and discharging said capacitor and thereby generating a surge of control voltage which varies in magnitude and passes through a value sufficient to render said electric valve conducting, and means for applying said surge of control voltage to said control element of said electric valve and adjusting it relatively to the anode-cathode voltage of said electric valve to initiate the flow of current through said electric valve at a predetermined point in the voltage wave of said source of periodic current.

16. Resistance welding apparatus comprising welding electrodes, a source of alternating current, a pair of asymmetrically disposed arc discharge valves provided with control elements and having their anode-cathode circuits energized from said source, means including said valves for controlling the flow of alternating current to said electrodes from said source, means for applying to the control elements of said valves a surge of control voltage which attains for a predetermined time a value sufficient to render said electric valves conducting for a predetermined number of half cycles of said source, and means for adjusting the phase relationship of said control voltage and the voltage of said source for initiating the flow of current through said valves to said welding electrodes at a predetermined time during the first half cycle of voltage of said predetermined number of half cycles and thereafter maintaining the flow of current for full half cycles to complete said predetermined number of half cycles of current flow.

17. Resistance welding apparatus comprising welding electrodes, a source of alternating current, a pair of asymmetrically disposed arc discharge valves each of which is provided with a control element, means including said pair of arc discharge valves for controlling the flow of alternating current from said source to said electrodes, a source of control voltage of sufficient magnitude to render said arc discharge valves conducting when applied to their control elements, means for applying said source of control voltage to said control elements of said arc discharge valves for starting the flow of current to said electrodes at a predetermined point in the voltage wave of said source of alternating current, and means for controlling the period of time during which said control voltage is effective for rendering said arc discharge valves conducting.

18. Welding apparatus comprising a source of alternating current, welding electrodes, means including an electric valve, for controlling the flow of current to said electrodes from said source, said valve having an anode, cathode and control element and having its anode-cathode circuit energized in accordance with the voltage of said source, means for applying to said control element a single peaked voltage wave of sufficient magnitude to render said electric valve conductive, and means for adjusting the time for application of said peaked voltage wave relative to the beginning of a cycle of voltage applied to the anode-cathode circuit of said electric valve.

19. Welding apparatus comprising a source of alternating current, welding electrodes, means including an electric valve, for controlling the flow of current to said electrodes from said source, said valve having an anode, cathode and control element and having its anode-cathode circuit energized in accordance with the voltage of said source, means for applying a bias voltage to the control element of said electric valve, means for applying to said control element a single peaked voltage wave of sufficient magnitude to render said electric valve conductive, and means for adjusting the time of application of said peaked voltage wave relative to the beginning of a cycle of voltage applied to the anode-cathode circuit of said electric valve.

20. Resistance welding apparatus comprising a source of alternating current, welding electrodes, means including an electric valve, for controlling the flow of current to said welding electrodes from said source, said valve having a control element and an anode-cathode circuit energized from said source, an energy storage device, circuit means including a second electric valve having a control element, for charging and discharging said energy storage device, means for applying to the control element of said first electric valve a control voltage derived from said circuit means, means for applying an alternating voltage and a bias voltage greater than the maximum value of said alternating voltage to the control element of said second electric valve, means for reducing the magnitude of said bias voltage on the control element of said second electric valve to a value less than the maximum value of said alternating voltage and thereafter upon the flow of current through said second electric valve increasing the bias voltage on the control element of said second electric valve to a value greater than the value of said alternating voltage, and means for adjusting the phase relationship between the alternating voltage applied to the control element of said second electric valve and the alternating voltage of said source.

21. Resistance welding apparatus comprising a source of alternating current, welding electrodes, means including an electric valve, for controlling the flow of current to said welding electrodes from said source, said valve having a control element and an anode-cathode circuit energized by said source, a capacitor, circuit means including a second electric valve having a control element, for charging and discharging said capacitor, means for applying to the control element of said first electric valve a bias voltage and a control voltage derived from said circuit means, means for applying to the control element of said second electric valve an alternating voltage and a bias voltage less in amount than the maximum value of said alternating voltage, means including a third electric valve having a control element, for increasing the bias voltage on the control element of said second electric valve to a value greater than the maximum value of said alternating voltage, means for applying a bias voltage to the control element of said third electric valve, means responsive to the discharge of said capacitor for overcoming the bias voltage on the control element of said third electric valve, and means for adjusting the phase relationship between the alternating voltage applied to the control element of said second electric valve and the alternating voltage of said source.

22. Resistance welding apparatus comprising welding electrodes, a source of current, means including an electric valve provided with a control element for supplying current to said electrodes from said source, and means for applying to said control element a bias voltage and a voltage of adjustable frequency, said last mentioned voltage being greater than and opposite in effect to said bias voltage for controlling the conductivity of said valve.

23. Resistance welding apparatus comprising welding electrodes, a source of periodic current, means including an electric valve provided with a control element for supplying current to said electrodes from said source of periodic current, an inverter circuit of adjustable frequency synchronized with said source of periodic current, and means for applying to said control element a bias voltage of the frequency of said source of periodic current and a voltage of said inverter circuit which is greater than and opposite in effect to said bias voltage for controlling the conductivity of said valve.

24. A welding system comprising a source of periodic current, a plurality of electrodes, a welding circuit connected to said electrodes and said source of current, an impedance in said circuit, means for controlling the effective value of said impedance including an electric valve provided with a control element, and means for applying to the control element of said electric valve a voltage whose period is a multiple of said source for controlling the conductivity of said electric valve.

25. Resistance welding apparatus comprising welding electrodes, a source of periodic current, means including an electric valve provided with a control element for controlling the flow of current from said source to said electrodes, and means for applying to said control element a bias voltage whose period is the same as the period of said source and an opposing voltage of greater amplitude than said bias voltage whose period is a multiple of the period of said source, for controlling the conductivity of said electric valve.

26. Resistance welding apparatus comprising welding electrodes, a source of periodic current, means for controlling the flow of current from said source to said electrodes including an electric valve provided with a control element, means for generating a periodic voltage whose period is a multiple of the period of said source, and means for applying to the control element of said electric valve a bias voltage and a voltage of said periodic voltage generating means for controlling said bias voltage and the conductivity of said valve.

27. Resistance welding apparatus comprising welding electrodes, a source of periodic welding current, means for controlling the flow of current from said source to said electrodes including an electric valve provided with a control element, means for generating a periodic voltage whose period is a multiple of the period of said source, and means for applying to the control element of said electric valve a periodic bias voltage and a voltage of said periodic voltage generating means for controlling said bias voltage and the conductivity of said valve.

28. Resistance line welding apparatus of the type in which the supply of welding current to the electrodes is periodically varied comprising welding electrodes, a source of periodic current, means for controlling the flow of current to said electrodes including an electric valve provided with a control element, a circuit for generating voltages whose period differs from that of said source, and means for applying a periodic voltage of said generating circuit to the control element of said electric valve to initiate and interrupt the flow of welding current.

29. A welding system comprising a plurality of electrodes, a welding transformer having primary and secondary windings, means for connecting said electrodes to the secondary winding of said welding transformer, a series controlling transformer having primary and secondary windings, a source of periodic current, means for connecting the primary of said series transformer in series with the primary of said welding transformer to said source of current, means including a grid controlled arc discharge device for short-circuiting the secondary of said series controlling transformer, and means for increasing at predetermined intervals of time the duration of which is equal to an integral number of periods of said source of current, the voltage of the grid of said discharge device above the critical voltage value at which current flows through said device and a predetermined interval of time thereafter decreasing said grid voltage below said critical value.

30. In a control system, in combination, a source of alternating current, a load, circuit means connecting the source of alternating current to the load, a pair of inversely connected space-discharge devices interposed between the source of alternating current and the load for controlling the flow of current to the load, a control electrode in each of said space-discharge devices, circuit means for applying an energizing potential to the control electrodes to render said space-discharge devices conducting, and a cut-off space-discharge device connected to the circuit means for effecting the removal of the energizing potential from the control electrodes to render the pair of space-discharge devices non-conducting.

31. In a control system, in combination, a source of alternating current, a load, circuit means connecting the source of alternating current to the load, a pair of inversely connected space discharge devices interposed between the source of alternating current and the load for controlling the flow of current to the load, a control electrode in each of said space discharge devices, a source of direct current, a start space discharge device connected to said control electrodes and to the source of direct current for applying energizing potential to said control electrodes to render the pair of space discharge devices conducting, and a cut-off space discharge device connected to said control electrodes for effecting the removal of the energizing potential therefrom to render the pair of space discharge devices nonconducting.

32. Apparatus for supplying power to a load that requires pulses of current each of which is precisely of a predetermined magnitude comprising a source of alternating current, circuit means connecting said source to said load, electric discharge means interposed in said circuit means for controlling the flow of current through said circuit, means for energizing said discharge means and means to be manually operated for initiating the operation of said energizing means, said energizing means including means for maintaining said discharge means energized, after said manual means has been once operated and regardless of the further condition of said manual means, for an interval of time such that a pulse of current of said predetermined magnitude is delivered to said load and for thereafter maintaining said discharge means deenergized.

33. Apparatus for supplying power to a load that requires pulses of current each of which is precisely of a predetermined magnitude comprising a source of alternating current, circuit means connecting said source to said load, electric discharge means for controlling the flow of current through said circuit means, means for energizing said discharge means, and means for initiating the operation of said energizing means, said energizing means including means for maintaining said discharge means energized, after said initiating means has been once operated and regardless of the further condition of said initiating means, for an interval of time such that a pulse of current of said predetermined magnitude is delivered to said load and for thereafter maintaining said discharge means deenergized.

HAROLD W. LORD.

CERTIFICATE OF CORRECTION.

Patent No. 2,253,129. August 19, 1941.

HAROLD W. LORD.

It is hereby certified that error appears in the printed specification of the above numbered patent requiring correction as follows: Page 2, first column, line 28, for the word "current" read --circuit--; line 37, for "prefere" read --prefer--; and that the said Letters Patent should be read with this correction therein that the same may conform to the record of the case in the Patent Office.

Signed and sealed this 14th day of October, A. D. 1941.

(Seal)

Henry Van Arsdale,
Acting Commissioner of Patents.